D. G. McLEAN.
CLINICAL THERMOMETER CASING.
APPLICATION FILED JULY 23, 1912.
1,060,553.
Patented Apr. 29, 1913.
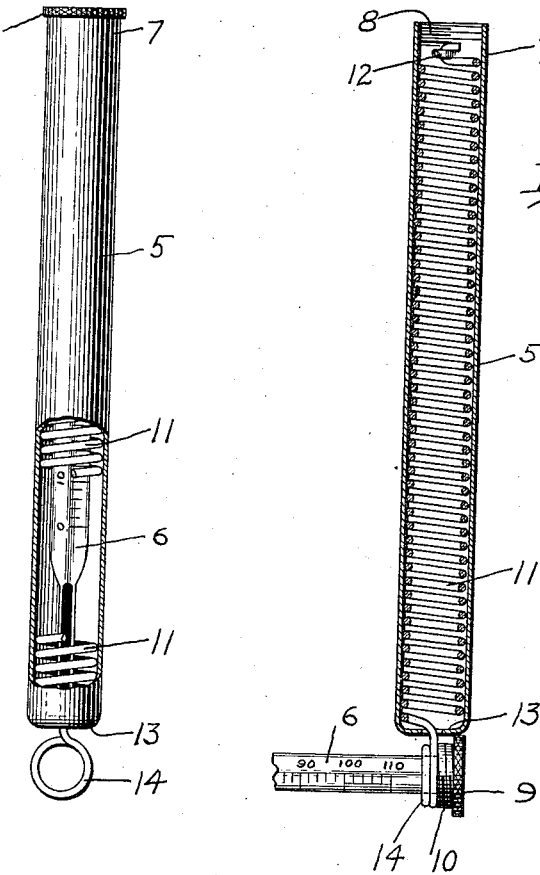
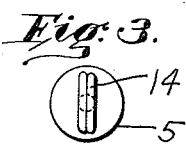
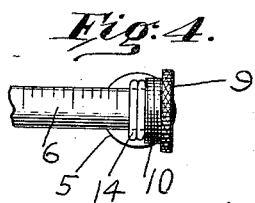
Witnesses:
Roswell F. Hatch.
E. F. Uniac.
Inventor:
Donald G. McLean
By Francis J. V. Dakin
Atty

UNITED STATES PATENT OFFICE.

DONALD G. McLEAN, OF BOSTON, MASSACHUSETTS, ASSIGNOR TO THE RANDALL-FAICHNEY COMPANY, OF BOSTON, MASSACHUSETTS, A CORPORATION OF MASSACHUSETTS.

CLINICAL-THERMOMETER CASING.

1,060,553.

Specification of Letters Patent.   Patented Apr. 29, 1913.

Application filed July 23, 1912.   Serial No. 711,063.

*To all whom it may concern:*

Be it known that I, DONALD G. MCLEAN, a citizen of the United States, residing at Boston, in the county of Suffolk and State of Massachusetts, have invented a new and useful Clinical-Thermometer Casing, of which the following is a specification, reference being had therein to the accompanying drawings.

This invention relates to casing for thermometers, especially clinical thermometers, and has for its object the providing of a casing of simple construction having means for utilizing centrifugal force to return the mercury in the thermometer back into the bulb after use.

I accomplish the foregoing object by providing a casing of any suitable and convenient form having arranged therein a spring, one end of which is secured to the casing and the other end of which projects through one end or the bottom of the casing in the form of a loop. The thermometer when inserted in the loop and turned several times to torsionally wind up the spring is released with the result that the spring causes the thermometer to be thrown around rapidly and the centrifugal force causes the thread of mercury to return to the bulb.

In the accompanying drawings illustrating the preferred form of the invention, Figure 1 is a general view of a casing constructed in accordance with my invention showing a thermometer mounted therein, a part of the casing being broken away to show the interior construction; Fig. 2 is a longitudinal sectional view of the casing showing the thermometer mounted in the loop on the spring in position for throwing down the mercury into the bulb; Fig. 3 is an end view looking upwardly in Fig. 1, and Fig. 4 is a similar end view showing the thermometer in the same position as in Fig. 2.

In the illustrated embodiment of the invention is shown a casing 5 adapted to hold a clinical thermometer 6 of usual form and to be carried in the pocket or elsewhere. The top 7 of the casing is open and provided with an interior thread 8 and the thermometer has a head 9 having a threaded portion 10 to engage the interior thread in the casing when the thermometer is not in use and is inserted therein as shown in Fig. 1. The head of the thermometer may be made in any suitable form so that the thermometer, instead of being secured within the casing by screwing its head into the top of the casing, may be held in place within the casing by any other well known means.

Within the casing is arranged a spring 11, preferably in helical form, the upper end of which is fastened to the casing in any suitable manner as by a hook 12. The bottom 13 of the casing is open and the other end of the spring projects through the open bottom and is turned several times to form a loop 14 the plane of which is parallel to the longitudinal axis of the spring or perpendicular to a transverse section of the casing. Instead of forming the loop from the end of the spring, it may be made from any suitable material and mounted on the end of the spring. After the spring has been mounted within the casing, the edge of the bottom of the casing may be turned inwardly to make a smooth finish.

When not in use the thermometer is carried in the casing as shown in Fig. 1, the casing being adapted to be carried in the pocket. The spring serves as an additional protection to prevent breakage or injury to the thermometer. After the thermometer has been in use and it is desired to return the mercury to the bulb, the casing may be held in any suitable position, either as shown in Fig. 2 or the reverse with the loop end of the casing uppermost, and the thermometer is inserted in the loop and turned several times to torsionally wind up the spring. It is then released and the torsional strain causes the thermometer to be whirled around rapidly with the result that the mercury is returned to the bulb by centrifugal force. The thermometer may then be withdrawn from the loop and returned to the casing.

It is to be observed that this construction is of extreme simplicity which permits it to be made at a very low cost, without reducing its efficiency in producing the desired result.

While the preferred embodiment of the present invention has been illustrated and described, it is to be understood that the present invention is not limited to the exact details of construction shown and described but may be otherwise embodied within the spirit of the invention and the scope of the following claims.

What I claim is:

1. A thermometer casing comprising a tubular body open at one end and a helical spring within said body, said spring having one end secured to said body at or near the opening thereof and the other end projecting out through the closed end of said body and turned to form a loop for holding a thermometer.

2. A thermometer casing having an interior helical spring, one end of which is secured within the casing and the other end of which is turned to form a loop the plane of said loop being perpendicular to a cross-section of the casing, said loop being outside of said casing.

3. A thermometer casing comprising a tubular body open at one end to receive and hold a thermometer, a helical spring within said tubular body, one end of said spring being fastened to the casing at the open end thereof and the other end of said spring passing through the other end of said casing and being formed into a loop outside of said casing; said loop being so arranged that a thermometer may be inserted therein and rotated when the spring is wound up and released.

In testimony whereof, I hereunto set my hand in the presence of two subscribing witnesses, this the nineteenth day of July, 1912.

DONALD G. McLEAN.

Witnesses:
E. R. BRACKETT,
A. L. HAYDEN.

Copies of this patent may be obtained for five cents each, by addressing the "Commissioner of Patents, Washington, D. C."